(12) United States Patent
Cross (10) Patent No.: US 9,300,184 B2
(45) Date of Patent: Mar. 29, 2016

(54) CLUTCHED FLYWHEEL TRANSMISSION

(75) Inventor: Douglas Cross, Milton Keynes (GB)

(73) Assignee: FlyBrid Automotive Limited, Birmingham (GB)

( * ) Notice: Subject to any disclaimer, the term of this patent is extended or adjusted under 35 U.S.C. 154(b) by 268 days.

(21) Appl. No.: 13/519,281

(22) PCT Filed: Dec. 17, 2010

(86) PCT No.: PCT/GB2010/052127
§ 371 (c)(1),
(2), (4) Date: Sep. 4, 2012

(87) PCT Pub. No.: WO2011/080512
PCT Pub. Date: Jul. 7, 2011

(65) Prior Publication Data
US 2013/0192399 A1    Aug. 1, 2013

(30) Foreign Application Priority Data
Jan. 4, 2010    (GB) .................................. 1000046.1

(51) Int. Cl.
*H02K 7/02*    (2006.01)
*B60K 6/10*    (2006.01)
*F16F 15/30*    (2006.01)

(52) U.S. Cl.
CPC ................ *H02K 7/025* (2013.01); *B60K 6/105* (2013.01); *F16F 15/30* (2013.01); *Y02E 60/16* (2013.01); *Y02T 10/6204* (2013.01); *Y10T 74/19614* (2015.01)

(58) Field of Classification Search
CPC ..... F16H 3/006; F16H 57/0006; F16H 57/04; F16F 15/30; B60K 6/105; H02K 7/02; H02K 7/025
USPC .................. 74/329, 331, 333, 572.2; 180/165
See application file for complete search history.

(56) References Cited

U.S. PATENT DOCUMENTS

| 1,789,169 | A | * | 1/1931 | Chilton | ................. F02N 19/001 123/179.22 |
| 3,425,293 | A | * | 2/1969 | Krawczyk et al. | ............... 74/360 |
| 3,515,011 | A | * | 6/1970 | Johnson | .......................... 74/467 |
| 4,276,951 | A |   | 7/1981 | Smitley | |
| 4,342,371 | A | * | 8/1982 | Smitley | ......................... 180/165 |
| 4,371,066 | A | * | 2/1983 | Fujioka et al. | ............. 192/85.34 |
| 4,583,505 | A | * | 4/1986 | Frank | ..................... B60K 6/105 123/198 F |
| 5,024,633 | A | * | 6/1991 | Schmidt | ................. B60K 6/105 475/72 |

FOREIGN PATENT DOCUMENTS

| DE | 2029572 | 12/1971 |
| EP | 0159445 | 3/1986 |
| EP | 2055519 | 5/2009 |
| GB | 2111612 | 7/1983 |
| JP | 57127154 | 7/1982 |
| JP | 01303341 | 7/1989 |
| WO | WO2009103591 | 8/2009 |

* cited by examiner

*Primary Examiner* — William C Joyce
(74) *Attorney, Agent, or Firm* — Stetina Brunda Garred & Brucker (57) ABSTRACT

An energy storage and recovery system device for a vehicle, comprising a flywheel, a first and a second set of gears, and multiple wet mutliplate clutches, wherein one of each gear set is arranged coaxially along a clutch shaft with one of the clutches, and wherein the device is coupled to the vehicle transmission, such that actuation of a clutch redirected the torque path via the gears, thereby enabling multiple ratios and therefore multiple speeds.

33 Claims, 6 Drawing Sheets

CLUTCHED FLYWHEEL TRANSMISSION

CROSS-REFERENCE TO RELATED APPLICATIONS

The present application claims priority to International Application No. PCT/GB2010/052127 which was filed on Dec. 17, 2010, which claims priority to the Great Britain Patent Application No. 1000046.1 filed Jan. 4, 2010.

STATEMENT RE: FEDERALLY SPONSORED RESEARCH/DEVELOPMENT

Not Applicable

BACKGROUND

This invention relates to a self-contained Energy Storage and Recovery System (ESRS) device for use in a vehicle, and specifically to an ESRS device comprising a high speed flywheel, i.e. a flywheel which can run at speeds greater than 20,000 revs, such as that disclosed in the applicant's patent no. GB2449117.

Currently known mechanical ESRS devices comprise a Continuously Variable Transmission (CVT) to transfer torque between the flywheel and the vehicle. The efficiency of torque transfer in a CVT-based ESRS device is dependent upon power, and only exhibits a high efficiency at high power levels.

An aim of the present invention is to provide mechanical ESRS devices comprise a Continuously Variable Transmission (CVT) to transfer torque between the flywheel and the vehicle. The efficiency of torque transfer in a CVT-based ESRS device is dependent upon power, and only exhibits a high efficiency at high power levels.

Accordingly the present invention provides, in a first aspect, an Energy Storage and Recovery System device as claimed in claim 1.

In a second aspect, the present invention provides a vehicle comprising a transmission shaft, wherein an ESRS device in accordance with the first aspect of the invention is mounted coupled to the transmission shaft.

An advantage of the present invention is that the multiple number of available gear ratios combined with the ability to slip clutches, provides a close approximation to the CVT of prior art embodiments, therefore resulting in a high round trip efficiency, for example of around 65% but with weight and cost savings. Furthermore, the device can change smoothly from one clutch to another, therefore eliminating the potential for torque discontinuity.

A further advantage of the present invention is that the device can be retrofitted onto current vehicles.

Furthermore, the efficiency of the torque transfer through the clutch-based transmission is completely independent of the power being transferred.

The device allows seamless transfer from one gear to another without torque interruption, and also negates the requirement for a gear change mechanism. Furthermore, the duration of the slip on each clutch is maintained at a short duration, thereby resulting in simpler thermal management.

Preferably the multiple clutches are wet mutliplate clutches, wherein a cooling oil flow is supplied to the centre of each clutch. The temperature of the clutches can thereby be maintained at an acceptable level, thereby prolonging the life of the clutches.

Preferably, a lubricant is supplied, via jets, to gear teeth as they come out of mesh, thereby controlling the temperature of the gear teeth, which would otherwise be high due to the high running speed of the flywheel, and also ensuring good lubrication.

Preferably each of the gears is located coaxially with a corresponding one of the gears and the respective clutch is a coaxially mounted wet, multiplate clutch located between the respective gears.

Preferably, the weight of the ESRS device is less than 20 kg, thereby optimising the efficiency of the vehicle into which it is fitted.

In a second aspect, the present invention provides a vehicle comprising a transmission input shaft, wherein an energy storage and recovery system device in accordance with the first aspect of the invention is coupled to the shaft.

BRIEF DESCRIPTION OF THE DRAWINGS

An embodiment of the present invention will now be described by way of example and with reference to the accompanying drawings in which.

DETAILED DESCRIPTION

Figure 1:
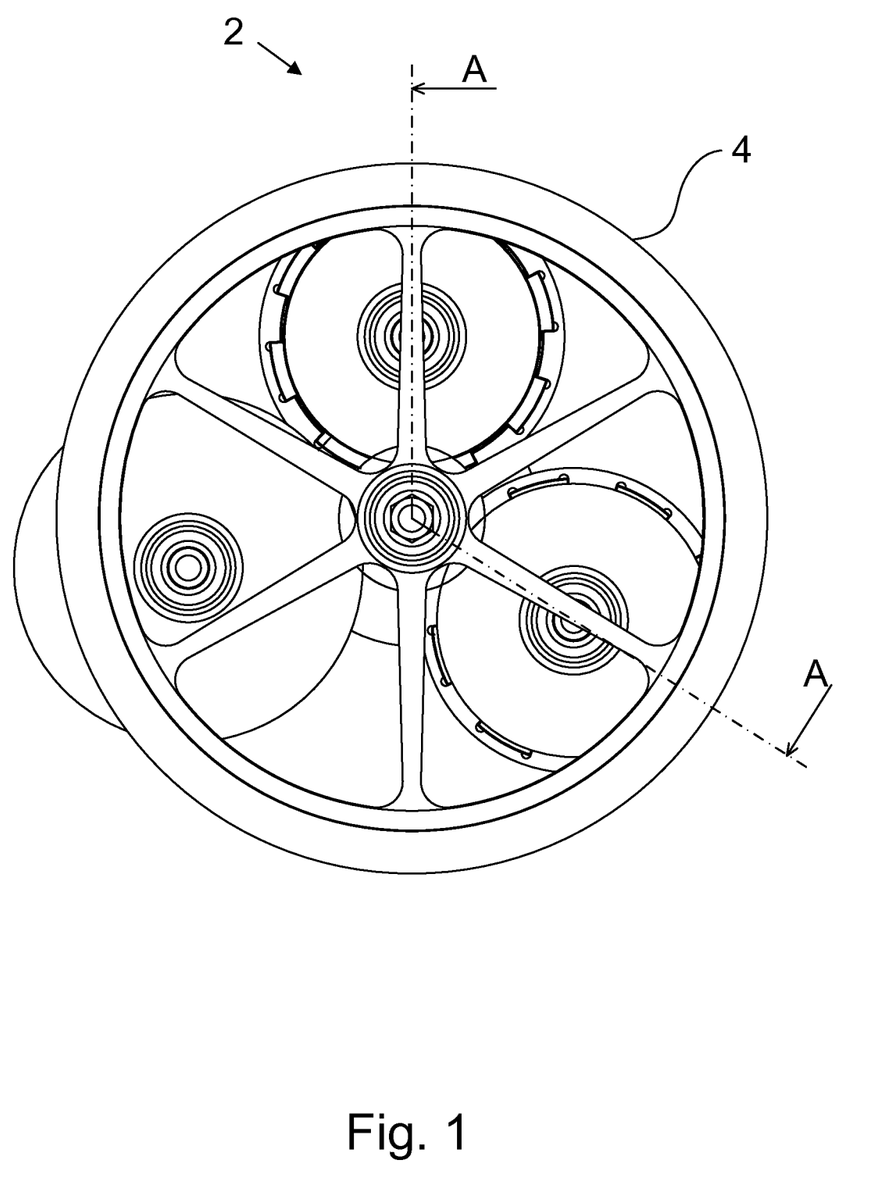
FIG. 1 is a front view of a ESRS device in accordance with the present invention.
Figure 2:
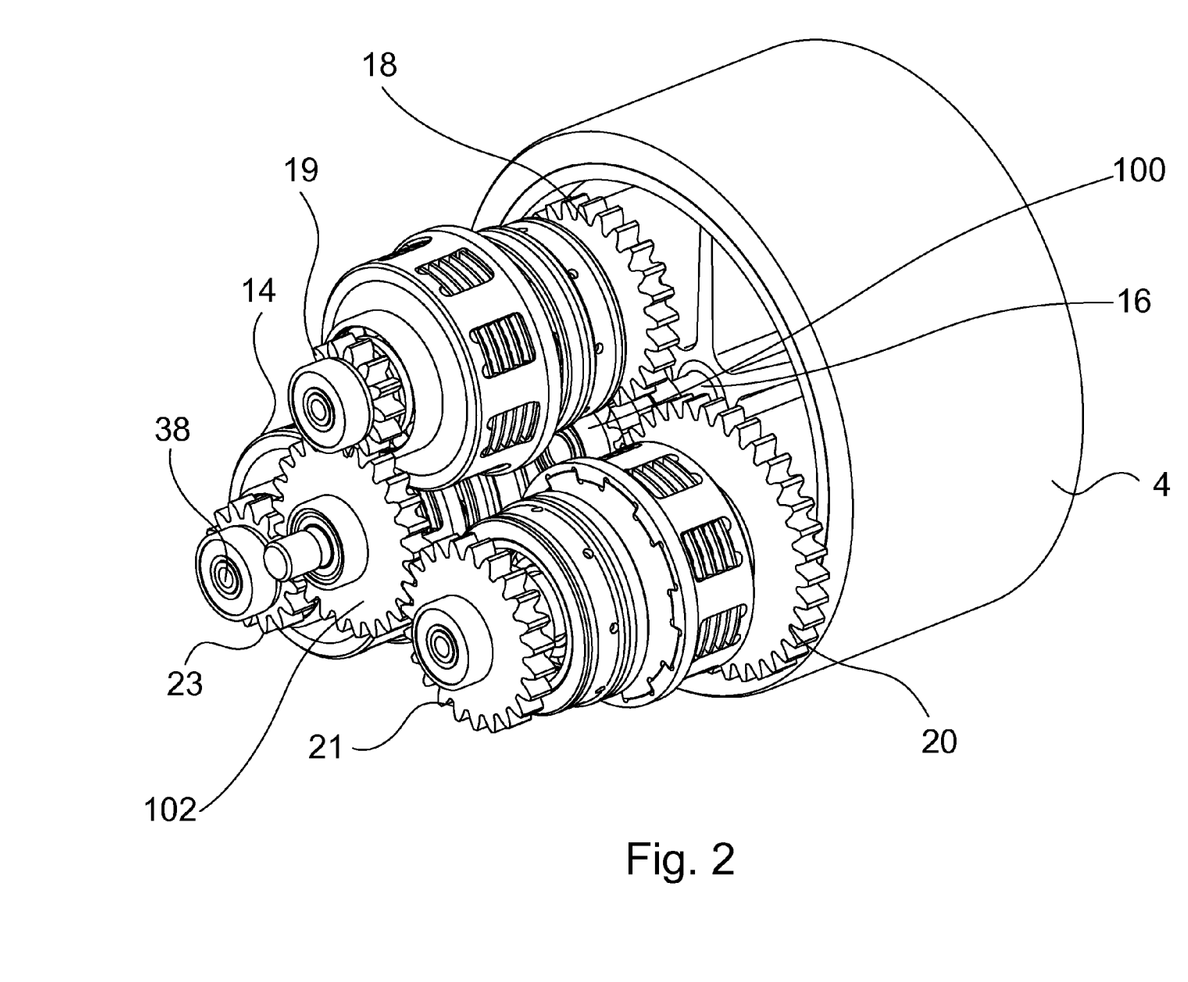
FIG. 2 is an isometric view of the ESRS device of FIG. 1.
Figure 3:
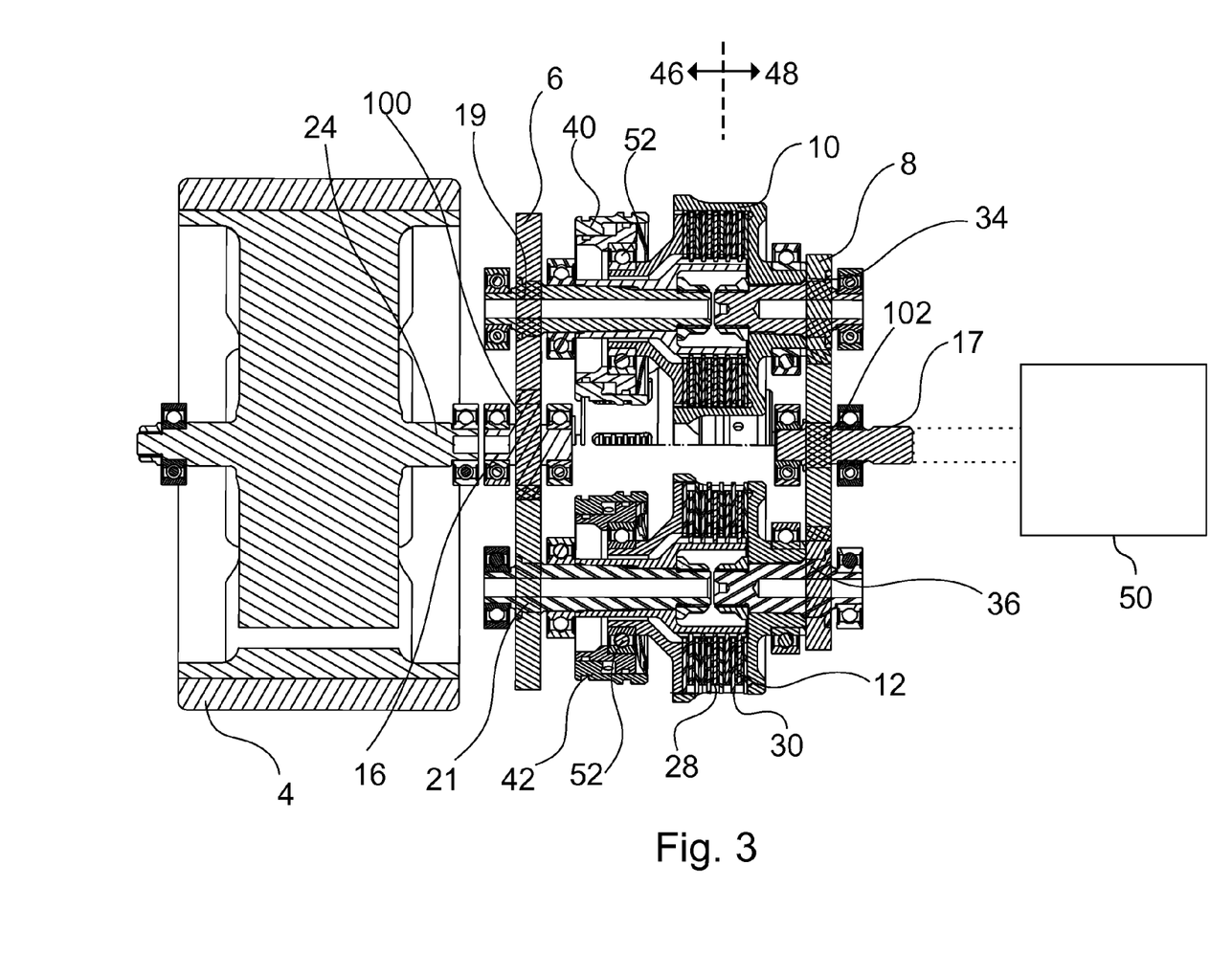
FIG. 3 is a cross-sectional view through section A-A of FIG. 1.

With reference to the FIGS. 1 to 3, the present invention comprises an Energy Storage and Recovery System (ESRS) device 2. The device 2 comprises a flywheel 4, a first set of gears 6, a second set of gears 8, multiple wet mutliplate clutches 10, 12, 14, and clutch shafts 34, 36, 38. The first set of gears 6 is constantly meshed via a first idler gear 100 mounted on a flywheel side, input shaft 16, and the second set of gears 8 is constantly meshed via a second idler gear 102 mounted on a vehicle side, output shaft 17.

The device is typically coupled to the torque path between the vehicle engine and the input shaft of the vehicle transmission.

An output shaft 24 of the flywheel 4 is connected to the input shaft 16 of the first set of gears 6 and the output shaft 17 of the second set of gears 8 is arranged for coupling to the input shaft of the vehicle's own gearbox 50 (see FIG. 3). It will be appreciated that in the nature of a ESRS device, energy flows both into and out of the flywheel and thus the use of the terms input and output in relation to the device can in most cases be reversed depending on the operating mode i.e. whether energy is being stored in or released from the flywheel.

The first set of gears 6 is located adjacent the flywheel, the second set of gears 8 remote from the flywheel, and the clutches 10, 12, 14 are located between the first set of gears 6 and the second set of gears 8 as described below.

The first set of gears comprises three gears 18, 20, 22, (22 is located at the rear of FIG. 3 and is therefore not indicated), which are in constant mesh with one another, and the second set of gears also comprises three gears 19, 21, 23 which are in constant mesh with one another. One gear of each set of gears 6, 8 is located either side of each of the clutches 10, 12, 14, such that each gear of a set has a dedicated clutch, i.e. on each clutch shaft is mounted one of the first set of gears 6, one of the clutches 10, 12, 14, and one of the second set of gears 8. Each of the gears 18, 20, 22 is located coaxially with a corresponding one of the gears 19, 21, 23 and the respective clutch 10, 12, 14 is a coaxially mounted wet, multiplate clutch located between the respective gears.

The clutches 10, 12, 14 are normally open, conventional wet multiple plates comprising a first set of plates 28 and a second set of plates 30. Each of the clutches 10, 12, 14 are individually actuable, via an actuator 40, 42, 44 associated with each clutch 10, 12, 14, respectively (actuator 44 is located at the rear of FIG. 3 and is therefore not indicated). The actuator 40, 42 or 44 pushes the clutch plates 28, 30, together, via a load-path which includes a bearing 52, therefore rotation of the actuator 40, 42 or 44 is not required. The actuator 40, 42 or 44 creates a normal force on the clutch plates 28, 30, which increases the torque in the clutch 10, 12 or 14, according to the equation:

$$F = \mu \times N$$

(F=friction force at the mean friction radius, μ=coefficient of friction of the clutch plates, N=normal force provided by the actuator).

The friction force F, acting at the mean friction radius provides the friction torque of the clutch 10, 12 or 14.

In the case where the flywheel 4 is delivering energy to the vehicle transmission, the flywheel side 46 of the clutch 10, 12 or 14 has a higher rotational speed than the vehicle side 48. Closing the clutch 10, 12 or 14 with pressure from the actuator 40, 42 or 44 causes energy to be lost at a power equal to the friction torque multiplied by the speed of the flywheel side 46 of the clutch 10, 12 or 14 (Watts=Nm×Rad/sec). The power arriving at the vehicle is equal to friction torque times the speed of the vehicle side of the clutch. The power lost to heating the clutch is friction torque multiplied by the difference in rotational speed across the clutch 10, 12 or 14. Thus the efficiency is only a function of speed difference across the clutch, not of rate of energy transfer.

When one of the clutches 10, 12 or 14 is actuated, the torque path is redirected, via the first set of gears 6, along the clutch shaft 34, 36, or 38 associated with the actuated clutch 10, 12 or 14, and via the second set of gears 8.

In normal operation of the device 2, one clutch 10, 12, 14 is usually slipping to provide the torque transfer from the flywheel 4 to the vehicle transmission or vice versa. As the speed across the selected clutch reduces to near zero, the next closest ratio is selected by applying pressure to the new clutch and removing pressure from the current clutch in a smooth manner.

As each gear 18, 20, 22, has a corresponding clutch, seamless transmission from one gear to another is effected, without torque interruption. Furthermore, the slip event on each clutch 10, 12, 14 is only for a short time. The actuator pressure may be made dependent on (typically proportional to) the vehicle's braking or accelerating torque to provide controlled slippage of the relevant clutch and also to reduce parasitic losses from the hydraulic pump.

Because the clutches 10, 12, 14 are individually actuable, multiple clutches can be actuated simultaneously. Actuation of multiple clutches will cause each of the actuated clutches to slip, thereby controlling the amount of energy sent to the flywheel to avoid overspeed conditions or to reduce the speed of the flywheel 4. The energy is dissipated as heat in the cooling lubricant, extracted from the clutches. This mode of operation has the effect of providing additional vehicle braking via the main transmission which helps, for example, to maintain a similar brake balance to a mode in which energy is being added to the flywheel.

In this embodiment, the device 2 can run at three ratios although other numbers of ratios could be provided. Therefore, the total number of available speeds is three multiplied by the number of speeds available in the main vehicle transmission, i.e. a 5 speed vehicle transmission would result in a total of 15 available speeds taken between the road wheels and the device flywheel, a 6 speed transmission in 18 total speeds, and a 7 speeds transmission in 21 total speeds.

Thus by simultaneously controlling or reading the vehicle's Transmission Control Module (TCM) to select appropriate gears in the main transmission and controlling the ratio in the device 2, any necessary slippage in the clutches 10, 12, 14 may be minimised for optimal efficiency. The overall ratio may then be selected to store energy in the flywheel (by choosing ratios to speed it up) during energy storage modes, or extracting energy by gradually slowing the flywheel down by loading it through the device's gears and into the vehicle's main transmission input shaft during energy recovery modes.

Figure 4:
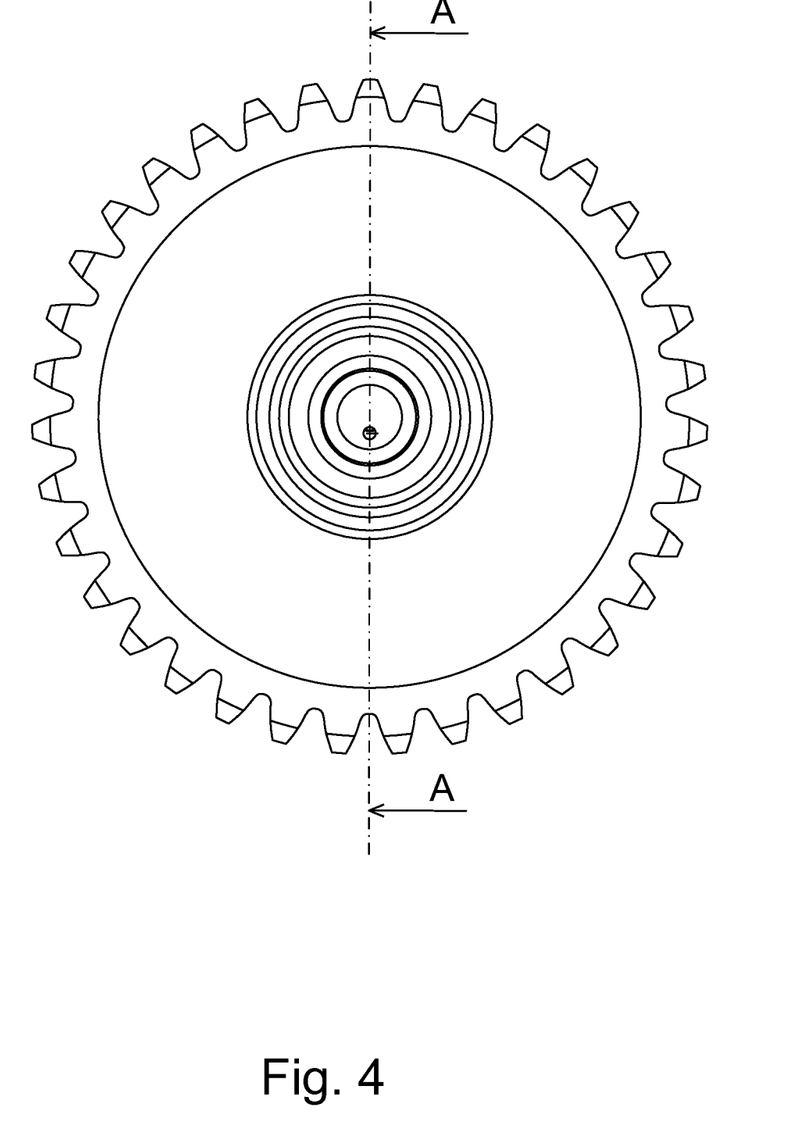
FIG. 4 is a front view of the lubrication system of the clutches of FIG. 1.
Figure 5:
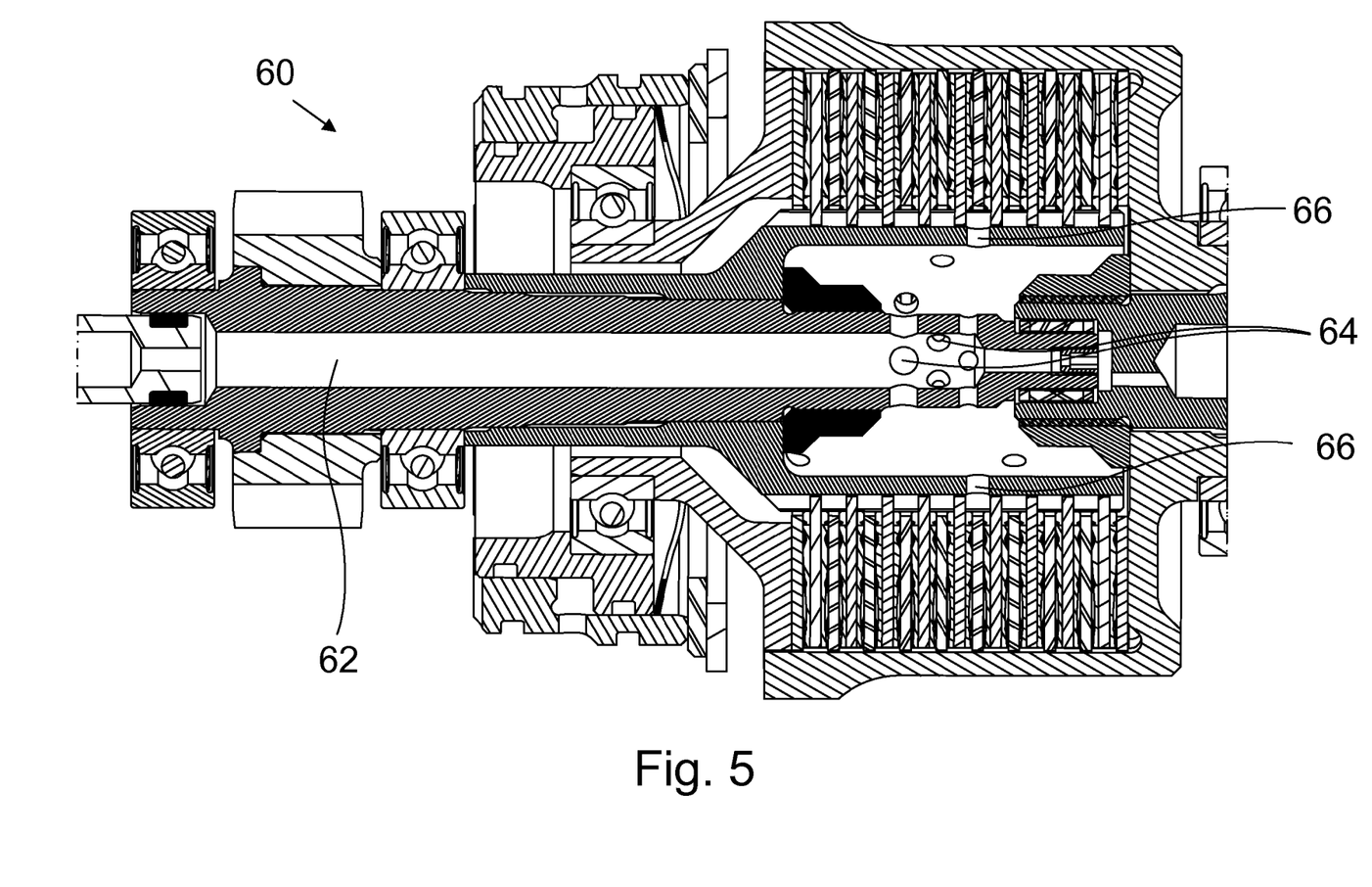
FIG. 5 is a cross-sectional view through section A-A of FIG. 4.

Although clutch slippage is minimised by an appropriate control strategy, wet clutches are used to allow good heat extraction from the clutches. The device 2 includes a clutch lubrication and cooling system 60 for supplying a cooling oil flow to the centre of each clutch 10, 12, 14, to control the clutch temperature. An embodiment of the clutch lubrication system is illustrated in FIGS. 4 and 5. Oil is supplied via the central bore 62 of each of the clutch shafts 34, 36, 38, and is distributed in an even manner via apertures 64 as the clutch shaft 34, 36, 38 rotates. Channels 66 allow the oil to enter the interstices of the clutch plates 28, 30.

Furthermore, both sides of the clutch are typically rotating (one with the flywheel and the other with the vehicle transmission input shaft) which helps distribute the cooling lubricant.

Figure 6:
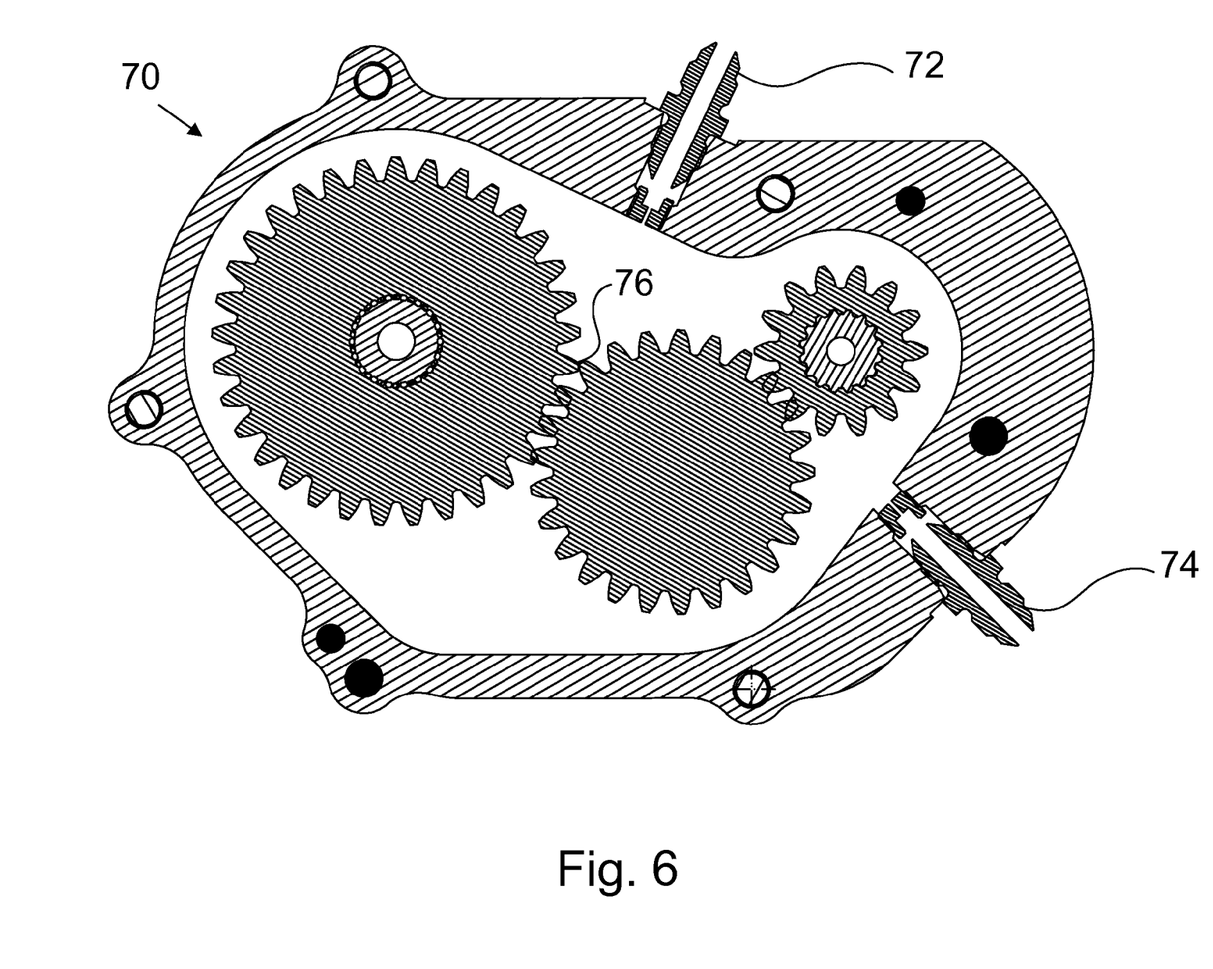
FIG. 6 is a cross sectional view of the squirt jets of the lubrication system of FIG. 4.

The device 2 also includes a gear lubrication system 70, as illustrated in FIG. 6. The gear lubrication system comprises jets 72 and 74 which aim oil at gear teeth 76 as they come out of mesh. The temperature control of the gear teeth via lubrication is particularly important due to the high running speed of the flywheel which generates high temperatures within the gears.

The invention claimed is:

1. An energy storage and recovery system device comprising a flywheel arranged for energy storage and a gearbox, wherein the gearbox comprises a first gear set comprising a first plurality of gears wherein each gear of the first gear set is operatively coupled to a first shaft, and a second gear set comprising a second plurality of gears wherein each gear of the second gear set is operatively coupled to a second shaft, and wherein each respective gear of the first gear set is paired to a respective gear of the second gear set, and is separated by a respective dedicated clutch in series, the pairs of gears and their respective clutches providing multiple torque transfer paths, at least two of the multiple torque transfer paths being configured to allow torque transfer in the same direction as one another;

wherein the first shaft is couplable to the flywheel arranged for energy storage, and the second shaft is couplable to a vehicle transmission, and wherein each respective clutch has a first side and a second side, wherein the first side of each respective clutch is coupled to the respective gear of the first gear set, and wherein the second side of each respective clutch is coupled to the respective gear of the second gear set, and wherein the clutches can be actuated individually to allow torque flow between the first gear set and the second gear set;

wherein the flywheel is not an engine flywheel; and wherein a control device is configured to control the operation of at least one of the clutches to provide substantially continuous slippage of at least one clutch throughout the duration of torque transfer through the at least one of the clutches.

2. An energy storage and recovery system device as claimed in claim 1 wherein the clutches are wet clutches.

3. An energy storage and recovery system device as claimed in claim 1 wherein a cooling oil flow is supplied to a centre of each clutch to control the clutch temperatures, the cooling oil enabling extraction of heat from the clutches to allow the substantially continuous slippage of the at least one clutch.

4. An energy storage and recovery system device as claimed in claim 1 wherein a lubricant is supplied, via jets, to gear teeth as they come out of mesh with the first or second intermediate gear.

5. An energy storage and recovery system device as claimed in claim 1 wherein each respective gear of the first gear set is located coaxially with its respective dedicated clutch and with the paired respective gear of the second gear set.

6. An energy storage and recovery system device as claimed in claim 1, wherein the flywheel for energy storage is coupled to the first shaft.

7. A vehicle comprising a transmission input shaft wherein an energy storage and recovery system device in accordance with claim 1 is coupled to an input shaft of the vehicle transmission.

8. An energy storage and recovery system device as claimed in claim 1, wherein the clutches can be actuated individually via an actuator configured to create a normal force on the clutch plates of the at least one clutch to increase the torque in the clutch, the normal force being substantially proportional to a braking or accelerating torque of the vehicle in order to provide controlled slippage of the at least one clutch.

9. An energy storage and recovery system device as claimed in claim 1, including a clutch lubrication and cooling system for supplying a cooling oil flow.

10. An energy storage and recovery system device as claimed in claim 9, wherein the at least one clutch is mounted on a clutch shaft, and wherein the clutch lubrication and cooling system includes a central bore of the clutch shaft and at least one aperture in the clutch shaft via which oil is supplied to the at least one clutch.

11. An energy storage and recovery system device as claimed in claim 1 wherein the device and the flywheel have a combined weight which is less than 20 kg.

12. An energy storage and recovery system device as claimed in claim 1 wherein at least one torque transfer path allows torque transfer in either direction along the path.

13. An energy storage and recovery system device as claimed in claim 1 wherein the flywheel is not mounted on an internal combustion engine crankshaft.

14. An energy storage and recovery system device as claimed in claim 1 wherein at least two of the said pairs of gears provide different gear ratios to one another.

15. An energy storage and recovery system device as claimed in claim 1 wherein the actuation force of the said individual actuation of the clutches is arranged to be modulated torque flow between the first gear set and the second gear set.

16. An energy storage and recovery system device comprising a gearbox, wherein the gearbox comprises a first gear set comprising a first plurality of gears wherein each gear of the first gear set is operatively coupled to a first shaft, and a second gear set comprising a second plurality of gears wherein each gear of the second gear set is operatively coupled to a second shaft, and wherein each respective gear of the first gear set is paired to a respective gear of the second gear set, and is separated by a respective dedicated clutch in series, the pairs of gears and their respective clutches providing multiple torque transfer paths, at least two of the multiple torque transfer paths being configured to allow torque transfer in the same direction as one another;

wherein the first shaft is couplable to a flywheel arranged for energy storage, and the second shaft is couplable to a vehicle transmission, and wherein each respective clutch has a first side and a second side, wherein the first side of each respective clutch is coupled to the respective gear of the first gear set, and wherein the second side of each respective clutch is coupled to the respective gear of the second gear set, and wherein the clutches can be actuated individually to allow torque flow between the first gear set and the second gear set; and wherein the device includes a controller arranged to control the operation of at least one of the clutches to cause substantially continuous slippage of at least one clutch throughout the duration of torque transfer through the clutch.

17. An energy storage and recovery system device as claimed in claim 16 wherein the clutches are wet clutches.

18. An energy storage and recovery system device as claimed in claim 16 wherein a cooling oil flow is supplied to a centre of each clutch to control clutch temperatures, the cooling oil enabling extraction of heat from the clutches to allow the substantially continuous slippage of the at least one clutch.

19. An energy storage and recovery system device as claimed in claim 16 wherein lubricant is supplied, via jets, to gear teeth as they come out of mesh with the first or second intermediate gear.

20. An energy storage and recovery system device as claimed in claim 16 wherein each respective gear of the first gear set is located coaxially with its respective dedicated clutch and with the paired respective gear of the second gear set.

21. An energy storage and recovery system device as claimed in claim 16 combined with a flywheel for energy storage that is couplable to the first shaft.

22. An energy storage and recovery system device as claimed in claim 21 wherein the device and the flywheel have a combined weight which is less than 20 kg.

23. A vehicle comprising a transmission input shaft, wherein an energy storage and recovery system device in accordance with claim 16 is coupled to an input shaft of the vehicle transmission.

24. An energy storage and recovery system device as claimed in claim 16 wherein the clutches can be actuated individually via an actuator configured to create a normal force on the clutch plates of the at least one clutch to increase the torque in the clutch, the normal force being substantially proportional to the vehicle braking or accelerating torque in order to provide controlled slippage of the at least one clutch.

25. An energy storage and recovery system device as claimed in claim 16, including a clutch lubrication and cooling system for supplying a cooling oil flow.

26. An energy storage and recovery system device as claimed in claim 25, wherein the at least one clutch is mounted on a clutch shaft, and wherein the clutch lubrication and cooling system includes a central bore of the clutch shaft and at least one aperture in the clutch shaft via which oil is supplied to the at least one clutch.

27. An energy storage and recovery system device as claimed in claim 16 wherein at least one torque transfer path allows torque transfer in either direction along the path.

28. An energy storage and recover system device as claimed in claim 16 wherein at least two of the said pairs of gears provide different gear ratios to one another.

29. An energy storage and recovery system device as claimed in claim 20 wherein the actuation force of the said individual actuation of the clutches is arranged to be modulated to modulate torque flow between the first gear set and the second gear set.

30. An energy storage and recovery system device comprising a flywheel arranged for energy storage and a gearbox, wherein the gearbox comprises a first gear set comprising gears wherein each gear of the first gear set is operatively coupled to a first shaft, and a second gear set comprising gears wherein each gear of the second gear set is operatively coupled to a second shaft, and wherein each respective gear of the first gear set is paired to a respective gear of the second gear set, and is separated by a respective dedicated clutch in series, the pairs of gears and their respective clutches providing multiple torque transfer paths, at least two of the multiple torque paths being configured to all torque transfer in the same direction as one another;

wherein the first shaft is couplable to the flywheel arranged for energy storage, and the second shaft is couplable to a vehicle transmission, and wherein each respective clutch has a first side and a second side, wherein the first side of each respective clutch is coupled to the respective gear of the first gear set, and wherein the second side of each respective clutch is coupled to the respective gear of the second gear set, and wherein the clutches can be actuated individually to allow torque flow between the first gear set and the second gear set;

wherein the flywheel is coupled to the first shaft such that energy can be stored in and recovered from the flywheel only via the gearbox; and wherein a control device is configured to control the operation of at least one of the clutches to provide substantially continuous slippage of at least one clutch throughout the duration of the torque transfer through the clutch.

31. An energy storage and recovery system device as claimed in claim 30 wherein the clutches are wet clutches, and a cooling oil flow is supplied to a centre of each clutch to control the clutch temperatures, the cooling oil enabling extraction of heat from the clutches to allow the substantially continuous slippage of the at least one clutch.

32. An energy storage and recovery system device as claimed in claim 30 wherein each respective gear of the first gear set is located coaxially with respective dedicated clutch and with the paired respective gear of the second gear set.

33. An energy storage and recovery system device as claimed in claim 30 wherein the clutches can be actuated individually via an actuator configured to create a normal force to the clutch plates of the at least one clutch to increase the torque in the clutch, the normal force being substantially proportional to the vehicle braking or accelerating torque in order to provide controlled slippage of the at least one clutch.

\* \* \* \* \*